E. G. & H. KLAHN.
CARNATION HOLDER.
APPLICATION FILED MAY 28, 1908.

903,986.  Patented Nov. 17, 1908.

Witnesses
Inventors
Emil G. Klahn and Henry Klahn
By C. A. Snow & Co.
Attorneys

UNITED STATES PATENT OFFICE.

EMIL G. KLAHN AND HENRY KLAHN, OF DURANGO, COLORADO.

CARNATION-HOLDER.

No. 903,986.　　　　　Specification of Letters Patent.　　　　Patented Nov. 17, 1908.

Application filed May 28, 1908. Serial No. 435,581.

*To all whom it may concern:*

Be it known that we, EMIL G. KLAHN and HENRY KLAHN, citizens of the United States, residing at 511 Third street, Durango, in the county of La Plata and State of Colorado, have invented a new and useful Carnation-Holder, of which the following is a specification.

This invention relates to stakes for supporting plants and flowers, and has for its object to provide an improved stake of this kind, which is simple in construction, has no detachable parts, and can be easily and rapidly folded up into compact shape for storing or shipping, and will occupy a small space.

The invention consists of a stake for plants and flowers, constructed as hereinafter set forth and claimed.

Figure 1:
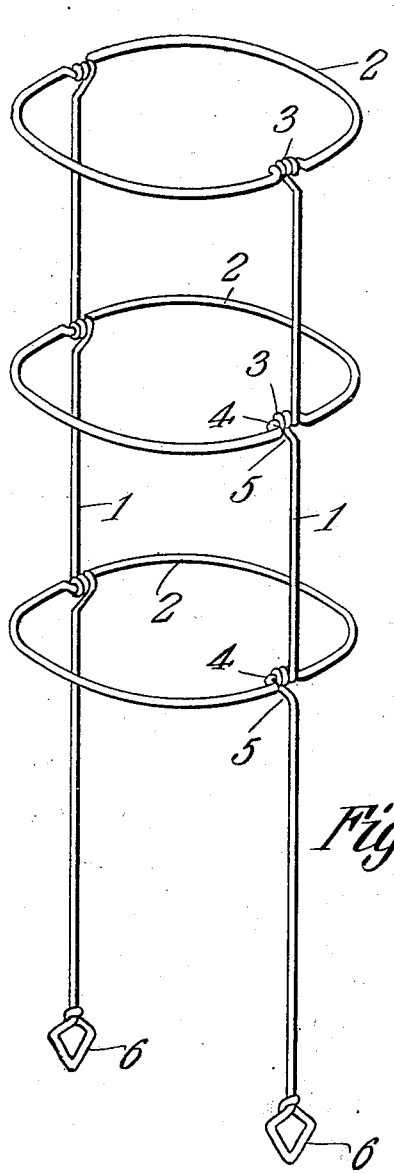
Figure 2:
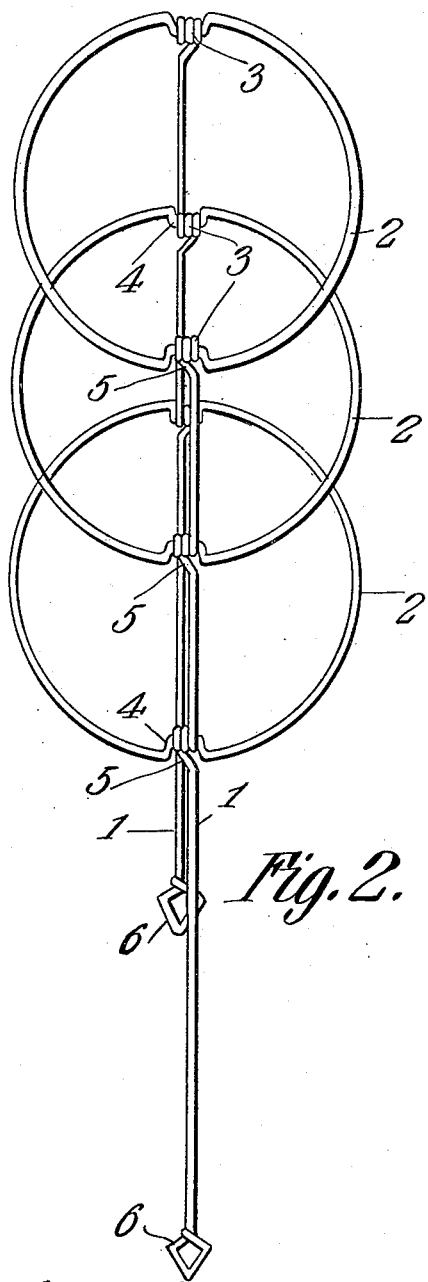

Referring to the drawing—Figure 1 is a view in perspective of the invention showing it in open position. Fig. 2 is a view thereof in elevation showing it folded.

The stake consists of two upright legs or props 1 made of wire, or other suitable material, and of any height desired, to which are hinged, in any suitable manner, rings 2 of wire or other suitable material, and preferably as here shown, by coils 3 of the uprights 1 twisted or looped at certain heights on the uprights 1 about the rings 2 on opposite sides thereof and serving as hinges. To prevent the rings 2 from slipping on the uprights 1, they are provided with suitable stops, preferably consisting of indentations 4 in which the coils 3 are located. In forming the coils 3 the uprights 1 are bent to form inwardly projecting arms 5 which accommodate the hinged connections formed by the coils to the indentations 4.

The uprights 1, which when in use stand in the ground, may be provided at their lower end with suitable means for holding the stake securely in the ground, and as here shown, preferably consisting of the triangular shaped anchor 6 formed by bending the end of the upright and twisting its end about the lower portion of the upright. The rings 3, which are used to sustain a plant or flower are of the same diameter, and may be of any number, preferably three. The rings 3 are mounted on the uprights 1 at varying distances from the lower end of the stake.

It will be seen that by means of the construction herein set forth, a light, and simple stake is provided which can be quickly and readily folded up, for shipping or storage, and in the folded position shown in Fig. 2 can be packed together in large quantities without occupying much space.

Having described the invention, we claim,

1. A stake for plants and flowers, consisting of a number of rings and a pair of wire uprights formed at intervals with coils, engaging the rings at fixed points and serving as hinges to fold the uprights and rings together.

2. A stake for plants and flowers, consisting of a number of rings formed with indentations, and a pair of wire uprights formed at intervals with coils engaging the rings in said indentations and serving as hinges to fold the uprights and rings together.

3. A device of the class described comprising a plurality of rings, and uprights pivotally connected with the rings at diametrically opposite points.

4. A stake for plants and flowers, consisting of a number of rings formed with indentations, and a pair of wire uprights formed at intervals with coils engaging the rings in said indentations, and serving as hinges to fold the uprights and rings together; the lower end of said uprights being bent to form a triangular anchor.

5. A device of the class described comprising a plurality of rings, and a pair of uprights pivotally connected with the rings at diametrically opposite fixed points, the rings at the points of pivotal connection of the uprights therewith being off-set.

6. A stake for plants and flowers, consisting of a number of spaced rings with indentations, and a pair of wire uprights formed at intervals with inwardly projecting arms terminating in coils engaging the rings in said indentations, and serving as hinges whereby the rings and uprights may be folded together.

In testimony that we claim the foregoing as our own, we have hereto affixed our signatures in the presence of two witnesses.

EMIL G. KLAHN.
　　　　　　　　　　HENRY KLAHN.

Witnesses:
　W. H. WING,
　ELLEN GALLOTTI.